(12) United States Patent
Tsuchiya et al.

(10) Patent No.: US 10,906,550 B2
(45) Date of Patent: Feb. 2, 2021

(54) VEHICLE CONTROL APPARATUS

(71) Applicant: HONDA MOTOR CO., LTD., Tokyo (JP)

(72) Inventors: Masamitsu Tsuchiya, Wako (JP); Yosuke Sakamoto, Wako (JP); Kazuma Ohara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 268 days.

(21) Appl. No.: 16/022,932

(22) Filed: Jun. 29, 2018

(65) Prior Publication Data
US 2019/0061761 A1  Feb. 28, 2019

(30) Foreign Application Priority Data

Aug. 24, 2017  (JP) .................. 2017-161329

(51) Int. Cl.
  *B60W 30/182*  (2020.01)
  *G05D 1/02*  (2020.01)
  *B60W 50/00*  (2006.01)
(52) U.S. Cl.
  CPC ...... *B60W 30/182* (2013.01); *B60W 50/0098* (2013.01); *G05D 1/021* (2013.01); *B60W 2540/00* (2013.01); *G05D 2201/0213* (2013.01)
(58) Field of Classification Search
  CPC ........... B60W 30/182; B60W 50/0098; B60W 2540/00; B60W 60/0021; B60W 60/0015; B60W 2540/047; B60W 2540/045; B60W 2540/221; B60W 40/08; G05D 1/021; G05D 2201/0213

USPC .......................................... 701/23
See application file for complete search history.

(56) References Cited

U.S. PATENT DOCUMENTS

| | | | | |
|---|---|---|---|---|
| 5,774,069 A | * | 6/1998 | Tanaka | B60W 50/14 340/903 |
| 8,855,860 B2 | * | 10/2014 | Isaji | B60W 30/10 701/41 |
| 10,067,505 B2 | * | 9/2018 | Ichikawa | B60W 40/00 |
| 10,558,213 B2 | * | 2/2020 | Sato | B62D 1/286 |

(Continued)

FOREIGN PATENT DOCUMENTS

| | | |
|---|---|---|
| JP | H09-161196 A | 6/1997 |
| JP | H11-290456 A | 10/1999 |

(Continued)

OTHER PUBLICATIONS

Japanese Office Action (w/ partial English translation) issued for Japanese Patent Application No. 2017-161329 dated Mar. 22, 2019.

(Continued)

*Primary Examiner* — Jonathan M Dager
*Assistant Examiner* — Jean W Charleston
(74) *Attorney, Agent, or Firm* — Thomas Horstemeyer, LLP

(57) ABSTRACT

The present invention provides a vehicle control apparatus capable of traveling a vehicle by automated driving, comprising a state detection unit configured to detect a state of an occupant in the vehicle, and a control unit configured to set a traveling mode of automated driving in accordance with a change in the state of the occupant detected by the state detection unit.

6 Claims, 3 Drawing Sheets

(56) References Cited

U.S. PATENT DOCUMENTS

| | | | | |
|---|---|---|---|---|
| 2013/0151077 A1* | 6/2013 | Kim | ............... | B62D 6/007 |
| | | | | 701/41 |
| 2014/0025259 A1* | 1/2014 | Szwabowski | ......... | B60W 50/00 |
| | | | | 701/36 |
| 2015/0346727 A1* | 12/2015 | Ramanujam | ....... | B62D 15/0285 |
| | | | | 701/23 |
| 2015/0348335 A1* | 12/2015 | Ramanujam | ......... | G05D 1/0088 |
| | | | | 701/23 |
| 2017/0038775 A1* | 2/2017 | Park | ............... | B60W 10/06 |
| 2018/0050701 A1* | 2/2018 | Grinenval | ............. | B60W 40/08 |
| 2018/0370365 A1* | 12/2018 | Lee | ................ | B60K 35/00 |
| 2019/0241099 A1* | 8/2019 | Sugiyama | ............... | B60N 2/68 |

FOREIGN PATENT DOCUMENTS

| | | | |
|---|---|---|---|
| JP | 2002-116271 A | | 4/2002 |
| JP | 2005-128631 | * | 5/2005 |
| JP | 2005-128631 A | | 5/2005 |
| JP | 2006-198023 A | | 8/2006 |
| JP | 2008-120271 | * | 5/2008 |
| JP | 2008-120271 A | | 5/2008 |
| JP | 2008-180591 A | | 8/2008 |
| JP | 2016-215677 A | | 12/2016 |
| JP | 2017-075840 A | | 4/2017 |

OTHER PUBLICATIONS

Japanese Office Action (w/ partial English translation) issued for Japanese Patent Application No. 2017-161329 dated Oct. 15, 2019.

* cited by examiner

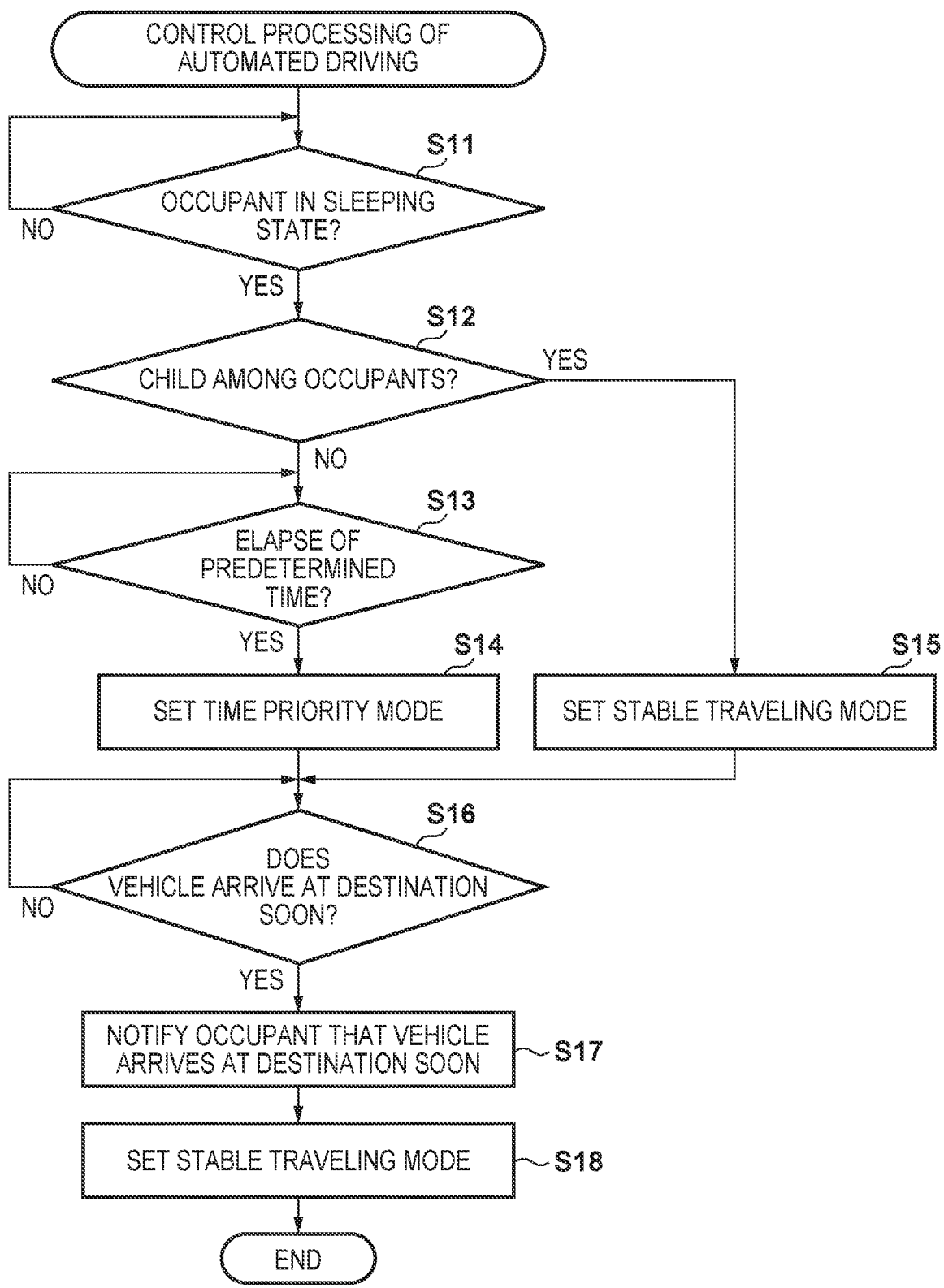

VEHICLE CONTROL APPARATUS

BACKGROUND OF THE INVENTION

Field of the Invention

The present invention relates to a control technique for a vehicle.

Description of the Related Art

Japanese Patent Laid-Open No. 2008-180591 discloses a method of reflecting the driving preference of a driver in automated driving of a vehicle.

In automated driving of a vehicle, the state of an occupant may change during traveling. When the state of the occupant changes in this way, a traveling mode that is initially set may be inappropriate for automated driving.

SUMMARY OF THE INVENTION

The present invention enables, for example, automated driving suitable for the state of an occupant in a vehicle.

According to one aspect of the present invention, there is provided a vehicle control apparatus capable of traveling a vehicle by automated driving, comprising: a state detection unit configured to detect a state of an occupant in the vehicle; and a control unit configured to set a traveling mode of automated driving in accordance with a change in the state of the occupant detected by the state detection unit.

Further features of the present invention will become apparent from the following description of exemplary embodiments with reference to the attached drawings.

BRIEF DESCRIPTION OF THE DRAWINGS

FIG. 3 is a flowchart showing an example of control of automated driving.

DESCRIPTION OF THE EMBODIMENTS

Figure 1:
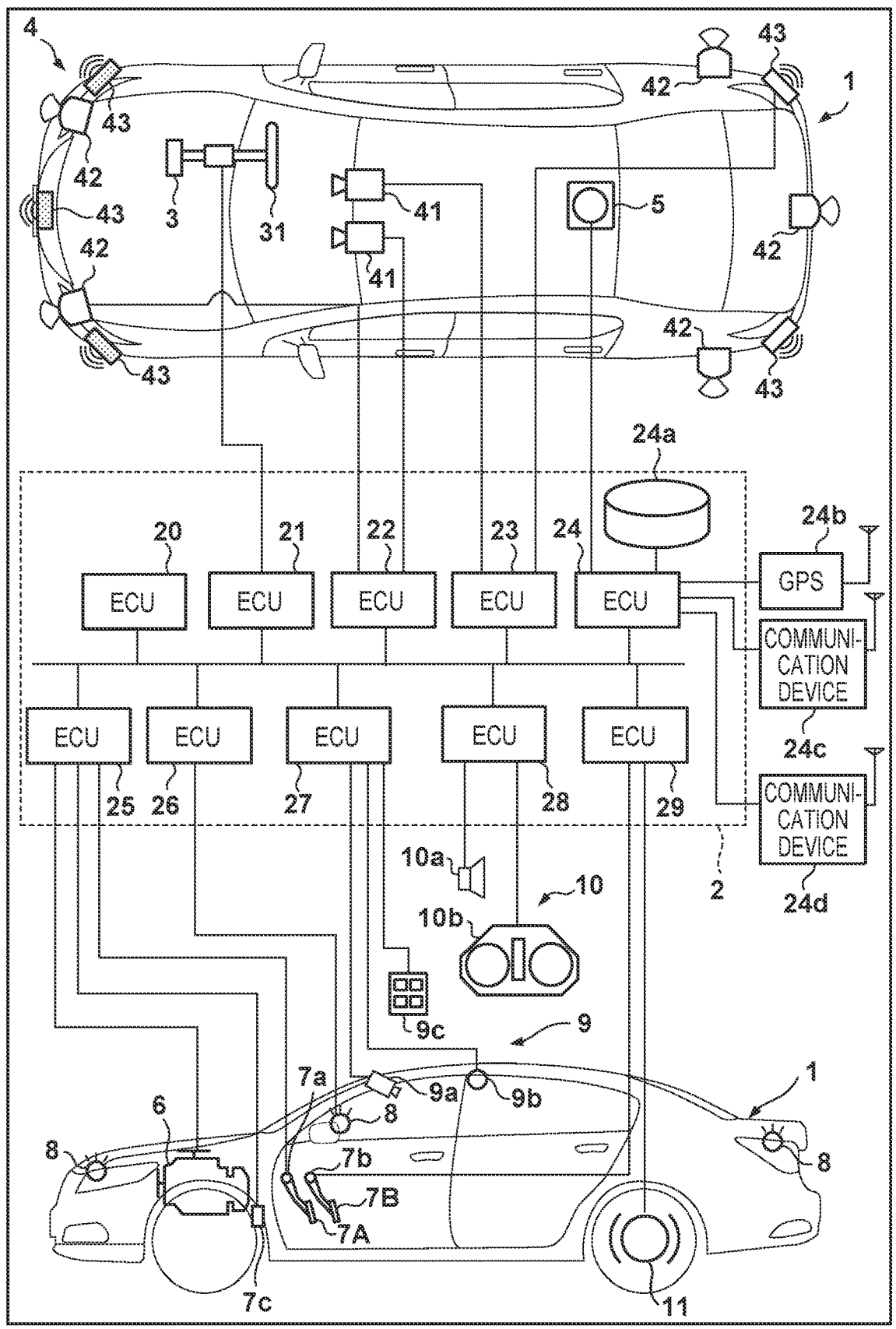
FIG. 1 is a block diagram of a vehicle control apparatus.

Exemplary embodiments of the present invention will be described below with reference to the accompanying drawings. Note that the same reference numerals denote the same members throughout the drawings, and a repetitive description thereof will not be given.

FIG. 1 is a block diagram of a vehicle control apparatus according to an embodiment of the present invention. The vehicle control apparatus shown in FIG. 1 is an apparatus that controls automated driving of a vehicle 1. In FIG. 1, the outline of the vehicle 1 is illustrated in a plan view and a side view. As an example, the vehicle 1 is a sedan-type four-wheeled vehicle.

The control apparatus shown in FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface to an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can appropriately be designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, both steering and acceleration/deceleration are automatically controlled. In addition, the ECU 20 controls automated driving of the vehicle 1 by one traveling mode of a plurality of traveling modes associated with automated driving. The traveling mode of automated driving can arbitrarily be set by an occupant via an input device 9c to be described later.

The plurality of traveling modes are set such that the speed, acceleration/deceleration, lane change frequency, and the like (to be sometimes referred to as "speed and the like" hereinafter) of the vehicle 1 during traveling change stepwise, and can include, for example, a normal traveling mode, a time priority mode, a stable traveling mode (comfort mode), a low fuel consumption mode, and the like. The normal traveling mode is a traveling mode close to traveling of a general driver. The time priority mode is a traveling mode that gives priority to reduction of time needed to arrive at the destination, and the speed and the like during traveling are higher than in other traveling modes. The stable traveling mode is a traveling mode that gives priority to reduction of the oscillation (the unstable motion) of the vehicle 1 during traveling, and the speed and the like during traveling are lower than in other traveling modes. The low fuel consumption mode is a traveling mode that gives priority to fuel consumption during traveling.

Figure 2:
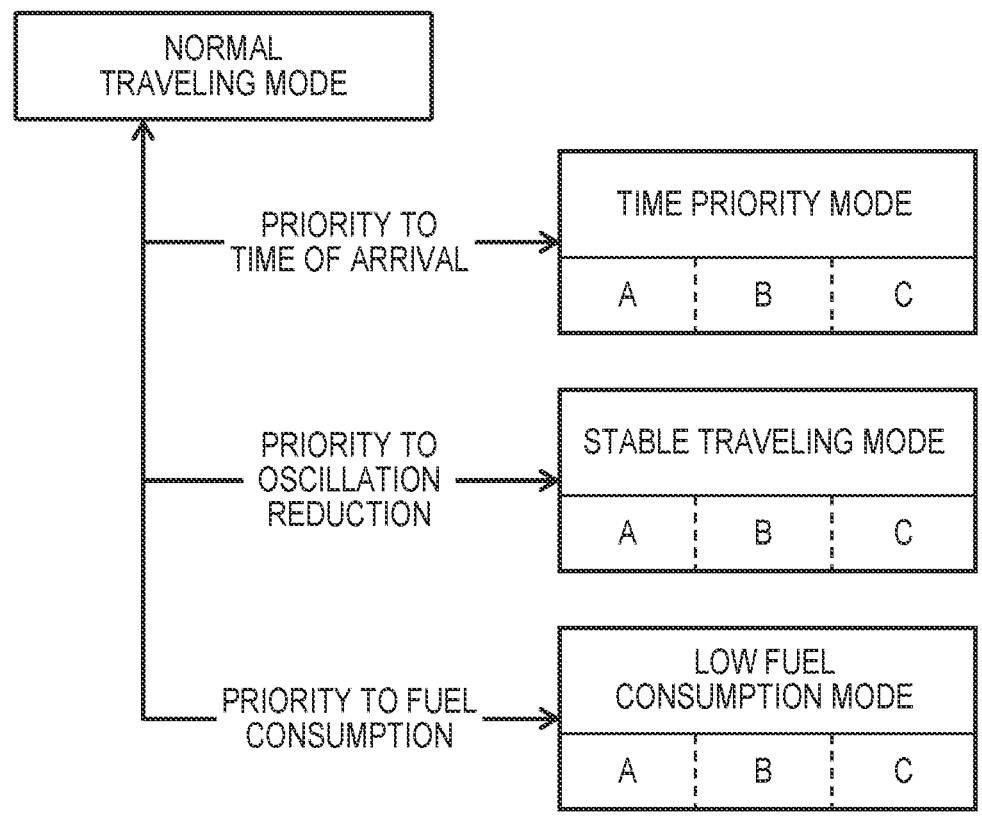
FIG. 2 is a conceptual view of a plurality of traveling modes.

Such traveling modes can be generated based on information obtained in previous traveling by, for example, an expert (a racer or the driver of a hired car) in each field so as to make the traveling close to that of the expert. Additionally, each of the plurality of traveling modes may be provided with a plurality of levels, as shown in FIG. 2. FIG. 2 is a conceptual view of the plurality of traveling modes. In the example shown in FIG. 2, three levels A to C are provided for each of the time priority mode, the stable traveling mode, and the low fuel consumption mode.

The ECU 21 controls an electric power steering device 3. The electric power steering device 3 includes a mechanism that steers front wheels in accordance with a driving operation (steering operation) of the driver on a steering wheel 31. In addition, the electric power steering device 3 includes a motor that generates a driving force to assist the steering operation or automatically steer the front wheels, a sensor that detects the steering angle, and the like. If the driving state of the vehicle 1 is automated driving, the ECU 21 automatically controls the electric power steering device 3 in correspondence with an instruction from the ECU 20 and controls the traveling direction of the vehicle 1.

The ECUs 22 and 23 perform control of detection units 41 to 43 that detect the peripheral state of the vehicle 1 and information processing of detection results. The detection unit 41 is a camera (to be sometimes referred to as the camera 41 hereinafter) that captures the front side of the vehicle 1. In this embodiment, two cameras 41 are provided on the roof front of the vehicle 1. When images captured by the cameras 41 are analyzed, the contour of a target or a division line (a white line or the like) of a lane on a road can be extracted.

The detection unit 42 is a lidar (laser radar) (to be sometimes referred to as the lidar 42 hereinafter), and detects a target on the periphery of the vehicle 1 or measures the distance to a target. In this embodiment, five lidars 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target on the periphery of the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each lidar 42 and information processing of detection results. The ECU 23 performs control of the other camera 41 and each radar 43 and information processing of detection results. Since two sets of devices that detect the peripheral state of the vehicle 1 are provided, the reliability of detection results can be improved. In addition, since detection units of different types such as cameras, lidars, and radars are provided, analysis of the peripheral environment of the vehicle 1 can be performed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information or traffic information and acquires these pieces of information. The ECU 24 can access a map information database 24a formed in the storage device. The ECU 24 searches for a route from the current position to the destination. The ECU 24 also includes a communication device 24d for inter-vehicle communication. The communication device 24d performs wireless communication with another vehicle on the periphery and performs information exchange between the vehicles.

The ECU 25 controls a power plant 6. The power plant 6 is a mechanism that outputs a driving force to rotate the driving wheels of the vehicle 1 and includes, for example, an engine and a transmission. The ECU 25, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 25 automatically controls the power plant 6 in correspondence with an instruction from the ECU 20 and controls the acceleration/deceleration of the vehicle 1.

The ECU 26 controls lighting devices (headlights, taillights, and the like) including direction indicators 8 (blinkers). In the example shown in FIG. 1, the direction indicators 8 are provided in the front portion, door mirrors, and the rear portion of the vehicle 1.

The ECU 27 performs control of a detection unit 9 that detects a state inside the vehicle and information processing of a detection result. As the detection unit 9, a camera 9a that captures the inside of the vehicle, a microphone 9b that detects a sound in the vehicle, and the input device 9c that accepts input of information from the occupant in the vehicle are provided. In this embodiment, one camera 9a is provided on the roof front portion of the vehicle 1. However, the camera 9a can be arranged such that the states of all occupants in the vehicle can be captured, and a plurality of cameras 9a may be provided. The microphone 9b can be arranged such that the voice of an occupant in the vehicle can be detected, and a plurality of microphones 9b may be provided. The input device 9c is a switch group that is arranged at a position where an occupant in the vehicle can operate the input device 9c and inputs an instruction to the vehicle 1.

The ECU 28 performs control of an output device 10. The output device 10 outputs information to the driver and accepts input of information from the driver. A voice output device 10a notifies information to the driver by a voice. A display device 10b notifies information to the driver by displaying an image. The display device 10b is arranged on, for example, the surface of the driver's seat and constitutes an instrument panel or the like. Note that although a voice and display have been exemplified here, information may be notified using a vibration or light. In addition, information may be notified by combining some of the voice, display, vibration, and light. Furthermore, the combination may be changed, or the notification form may be changed in accordance with the level (for example, the degree of urgency) of information to be notified.

The ECU 29 controls a brake device 11 and a parking brake (not shown). The brake device 11 is, for example, a disc brake device which is provided for each wheel of the vehicle 1 and decelerates or stops the vehicle 1 by applying a resistance to the rotation of the wheel. The ECU 29, for example, controls the operation of the brake device 11 in correspondence with a driving operation (brake operation) of the driver detected by an operation detection sensor 7b provided on a brake pedal 7B. If the driving state of the vehicle 1 is automated driving, the ECU 29 automatically controls the brake device 11 in correspondence with an instruction from the ECU 20 and controls deceleration and stop of the vehicle 1. The brake device 11 or the parking brake can also be operated to maintain the stop state of the vehicle 1. In addition, if the transmission of the power plant 6 includes a parking lock mechanism, it can be operated to maintain the stop state of the vehicle 1.

When automated driving is being performed by the thus constituted vehicle 1, the traveling mode of automated driving may be changed in accordance with the state in the vehicle. For example, the occupant in the vehicle may sleep until arrival at the destination. In this case, the occupant often wants to arrive at the destination as soon as possible rather than comfort. Additionally, if a child (for example, a preschool child or a baby) exists among occupants, it is desirable to prevent the sleeping child from waking up or reduce the load on the child during traveling by reducing the oscillation (the unstable motion) of the vehicle 1 during traveling as much as possible. For this purpose, the ECU 20 according to this embodiment detects the state (a change in the state of an occupant and whether a child exists among occupants) in the vehicle by the detection unit 9 such as the camera 9a, the microphone 9b, and the input device 9c and controls the traveling mode of automated driving in accordance with the detected state in the vehicle.

Control of the traveling mode of automated driving executed by the ECU 20 according to this embodiment will be described below with reference to FIG. 3. FIG. 3 is a flowchart showing an example of control processing of automated driving executed by the ECU 20 according to this embodiment.

In step S11, the ECU 20 determines (detects) by the detection unit 9 whether an occupant is in a sleeping state. For example, the ECU 20 can determine that an occupant is in the sleeping state from an image obtained by the camera 9a using a known image analysis method in a case in which the motion of the occupant is less than before or in a case in which the motion of the occupant during a predetermined period is not more than a predetermined threshold. Alternatively, the ECU 20 may determine that the occupant is in the sleeping state from an image obtained by the camera 9a in a case in which the occupant lies down or in a case in which a quilt is put on. If it is possible to detect, from an image obtained by the camera 9a, whether the eyes of an occupant are closed, the ECU 20 may detect that the occupant is in the sleeping state upon detecting that the eyes of the occupant are closed for a predetermined period. Here, if a child seat is provided in the vehicle, the ECU 20 may determine that the child is in the sleeping state by acquiring a signal representing the sleep of the child detected by the child seat.

In addition, the ECU 20 can determine that an occupant is in the sleeping state from a sound in the vehicle obtained by the microphone 9b using a known speech analysis method in a case in which the voice of the occupant is rarely obtained or in a case in which snoring of the occupant is detected. The ECU 20 may determine that the occupant is in the sleeping state when an instruction representing that the occupant is going to sleep is input by the occupant via the input device 9c.

Upon determining in step S11 that the occupant is in the sleeping state, the process advances to step S12. On the other hand, upon determining that the occupant is not in the sleeping state, the current traveling mode of automated driving is maintained, and the step S11 is repeated.

In step S12, the ECU 20 determines (detects) by the detection unit 9 whether a child (for example, a preschool child or a baby) exists in the vehicle. For example, the ECU 20 can determine that a child exists among the occupants from an image obtained by the camera 9a using a known image analysis method in a case in which a child seat is detected in the vehicle or in a case in which a person whose height is not more than a threshold is detected. In addition, the ECU 20 can determine that a child exists among the occupants from a sound in the vehicle obtained by the microphone 9b so far using a known speech analysis method, for example, in a case in which a frequency band corresponding to a child voice is detected. The ECU 20 may determine (detect) that a child exists among the occupants when an instruction representing that a child exists among the occupants is input by an occupant via the input device 9c.

Upon determining in step S12 that no child exists among the occupants, the process advances to step S13. In step S13, the ECU 20 determines whether a predetermined time has elapsed from the determination of the sleeping state of the occupant in step S11. Upon determining that the predetermined period has elapsed, the process advances to step S14 to set the traveling mode of automated driving to the time priority mode. For example, if the current traveling mode is a mode different from the time priority mode, the ECU 20 switches the traveling mode of automated driving from the different mode to the time priority mode. That is, the ECU 20 switches the traveling mode of automated driving to a traveling mode capable of decreasing the time up to arrival at the destination as compared to the current traveling mode. As described above, the time priority mode is a traveling mode that gives priority to reduction of time until arrival at the destination. This is a traveling mode in which, for example, a restriction concerning an operation that causes an oscillation (the unstable motion) of the vehicle 1 such as a lane change is relaxed as compared to the other traveling mode (for example, the stable traveling mode).

The time priority mode is set after the elapse of the predetermined time in this way because immediately after the occupant changes to the sleeping state, the sleep of the occupant is light, and the possibility that the occupant is awakened by the oscillation (the unstable motion) of the vehicle 1 traveled in the time priority mode is high. For this reason, the ECU 20 can set the stable traveling mode that gives priority to reduction of the oscillation (the unstable motion) of the vehicle 1 so as not to break the sleep of the occupant during the predetermined time and switches the traveling mode from the stable traveling mode to the time priority mode after the elapse of the predetermined time. The predetermined time can arbitrarily be set to a time input by the occupant via the input device 9c, a general time from falling asleep to a deep sleep (rem sleep), or the like. In this embodiment, the process of step S13 is provided, and the time priority mode is set as the traveling mode of automated driving after the elapse of the predetermined time after it is determined that the occupant is in the sleeping state. However, without performing the process of step S13, the time priority mode may immediately be set upon determining that the occupant is in the sleeping state.

Upon determining in step S12 that a child exists among the occupants, the process advances to step S15 to set the traveling mode of automated driving to the stable traveling mode even if it is determined in step S11 that the occupant is in the sleeping state. When the traveling mode of automated driving is set to the stable traveling mode in this way, it is possible to prevent the sleeping child from waking up or reduce the load on the child during traveling by reducing the oscillation (the unstable motion) of the vehicle 1 during traveling. As described above, the stable traveling mode is a traveling mode that gives priority to reduction of the oscillation (the unstable motion) of the vehicle 1 at the time of traveling. This is a traveling mode in which, for example, a restriction concerning an operation that causes an oscillation (unstable motion) of the vehicle 1 such as a lane change is stricter than in the other traveling mode (for example, the time priority mode).

In step S16, the ECU 20 determines, based on the current position of the vehicle 1 detected by the GPS sensor 24b or the like, whether the vehicle arrives at the destination soon. For example, the ECU 20 can determine that the vehicle arrives at the destination soon when the distance between the destination and the current position of the vehicle 1 detected by the GPS sensor 24b falls within a predetermined range. Alternatively, the ECU 20 may estimate the estimated time of arrival at the destination according to the set traveling mode (the time priority mode or the stable traveling mode) and determine that the vehicle arrives at the destination soon when the difference between the estimated time of arrival and the current time falls within a predetermined range. The ECU 20 can estimate the estimated time of arrival by acquiring map information or traffic information from a server outside the vehicle via the communication device 24c and calculating, based on the acquired information, the time needed to arrive at the destination when the vehicle is traveled in the set traveling mode. Such an estimated time of arrival can successively be estimated and updated during traveling based on a result obtained by learning the traveling state (the number of times of lane change), the average speed, and the like in the set traveling mode. The ECU 20 may transmit the destination to the server outside the vehicle via the communication device 24c and acquire an estimated time of arrival estimated by the server via the communication device 24c.

Upon determining in step S16 that the vehicle arrives at the destination soon, the process advances to step S17, and the ECU 20 notifies the occupant, via the output device 10, that the vehicle arrives at the destination soon. For example, the ECU 20 may notify the occupant by outputting a voice representing this from the voice output device 10a or may notify the occupant by displaying this on the display device 10b. This can awaken the occupant. Additionally, in step S18, the ECU 20 sets the traveling mode of automated driving to the stable traveling mode. This allows the occupant to spend the time after awakening comfortably without feeling discomfort caused by the oscillation (the unstable motion) of the vehicle 1. Here, in this embodiment, step S18 is performed after step S17 in which the occupant is notified via the output device 10 that the vehicle arrives at the destination soon. However, step S18 may be performed before or at the same time as step S17. In step S18, the traveling mode of automated driving is set to the stable traveling mode. However, the traveling mode is not limited to the stable traveling mode, and may be set to the traveling mode before it is determined in step S11 that the occupant is in the sleeping state.

As described above, in this embodiment, the traveling mode of automated driving is changed in accordance with the state of the occupant in the vehicle detected by the detection unit 9. This makes it possible to appropriately set the traveling mode of automated driving in accordance with a situation when, for example, an occupant in the vehicle is in the sleeping state, or a child exists among the occupants in the vehicle. Here, in this embodiment, the traveling mode in a case in which the occupant is in the sleeping state is set to the time priority mode. However, the present invention is not limited to this, and another mode may be set. For example, the traveling mode in a case in which the occupant is in the sleeping state may be set in advance by the occupant via the input device 9c.

SUMMARY OF EMBODIMENT

1. A vehicle control apparatus according to the above-described embodiment is a vehicle control apparatus capable of traveling a vehicle (for example, 1) by automated driving, comprising a state detection unit (for example, 9) configured to detect a state of an occupant in the vehicle, and a control unit (for example, 20) configured to set a traveling mode of automated driving in accordance with a change in the state of the occupant detected by the state detection unit. According to this embodiment, it is possible to perform automated driving in a traveling mode suitable for the state of the occupant in the vehicle.

2. In the above-described embodiment, if it is detected by the state detection unit that the occupant is in a sleeping state, the control unit sets the traveling mode of automated driving to a traveling mode capable of reducing time until arrival at a destination as compared to a current traveling mode. According to this embodiment, it is possible to perform automated driving to meet the requirement of the occupant who wants to quickly arrive at the destination while sleeping.

3. In the above-described embodiment, the traveling mode of automated driving includes at least a time priority mode and a stable traveling mode, the time priority mode is a traveling mode that gives priority to reduction of time until arrival at a destination, and the stable traveling mode is a traveling mode that gives priority to reduction of an oscillation (unstable motion) of vehicle during traveling. According to this embodiment, it is possible to select a traveling mode suitable for the state of the occupant in the vehicle.

4. In the above-described embodiment, if it is detected by the state detection unit that the occupant is in a sleeping state, the control unit sets the traveling mode of automated driving to the time priority mode. According to this embodiment, it is possible to perform automated driving to meet the requirement of the occupant who wants to quickly arrive at the destination while sleeping.

5. In the above-described embodiment, the control unit sets the traveling mode of automated driving to the time priority mode after an elapse of a predetermined time after it is detected by the state detection unit that the occupant is in a sleeping state. According to this embodiment, it is possible to prevent the occupant whose sleep is light immediately after changing to the sleeping state from waking up.

6. In the above-described embodiment, the control unit sets the traveling mode of automated driving during the predetermined time to the stable traveling mode. According to this embodiment, it is possible to lead the occupant to a deeper sleep.

7. In the above-described embodiment, the apparatus further comprises a child detection unit configured to detect whether a child exists in the vehicle, and if it is detected by the child detection unit that a child exists in the vehicle, the control unit sets the traveling mode of automated driving to the stable traveling mode. According to this embodiment, it is possible to prevent the sleeping child from waking up or reduce the load on the child during traveling.

8. In the above-described embodiment, if it is detected by the child detection unit that a child exists in the vehicle, the control unit sets the traveling mode of automated driving to the stable traveling mode even if it is detected by the state detection unit that the occupant is in the sleeping state. According to this embodiment, it is possible to perform automated driving in a traveling mode that gives priority to the child over the requirement of the occupant who wants to quickly arrive at the destination while sleeping.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-161329 filed on Aug. 24, 2017, which is hereby incorporated by reference herein in its entirety.

What is claimed is:

1. A vehicle control apparatus capable of traveling a vehicle by automated driving, comprising:
   a state detection unit configured to detect a state of an occupant in the vehicle;
   a notification unit configured to notify the occupant of information indicating that arrival at a destination is near; and
   a control unit configured to set a traveling mode of automated driving in accordance with a change in the state of the occupant detected by the state detection unit,
   wherein the control unit has, as the traveling mode, a first mode and a second mode which gives priority to reduction of an oscillation of the vehicle as compared with the first mode, and
   wherein the control unit is configured to in a case where the state of the occupant detected by the state detection unit is a sleeping state, set the traveling mode to the first mode, and in a case of notifying the occupant of the information by the notification unit during traveling in the first mode, change the traveling mode from the first mode to the second mode before notification of the information.

2. The apparatus according to claim 1, wherein the first mode is a traveling mode that gives priority to reduction of time until arrival at a destination, and the second mode is a traveling mode that gives priority to reduction of an oscillation of vehicle during traveling.

3. The apparatus according to claim 2, further comprising a child detection unit configured to detect whether a child exists in the vehicle, wherein even if the state detection unit detects the sleeping state of the occupant, in a case where the child detection unit detects that a child exists in the vehicle, the control unit keeps the second mode without changing the traveling mode from the second mode to the first mode.

4. The apparatus according to claim 1, wherein in a case where the state detection unit detects the sleeping state of the occupant after starting the automated driving in the second mode, the control unit changes the traveling mode from the second mode to the first mode.

5. The apparatus according to claim 4, wherein the control unit changes the traveling mode from the second mode to the first mode after an elapse of a predetermined time since the state detection unit detects the sleeping state of the occupant.

6. The apparatus according to claim 5, wherein the control unit sets the traveling mode during the predetermined time to the second mode.

\* \* \* \* \*